United States Patent
Křoustek et al.

(10) Patent No.: US 11,924,228 B2
(45) Date of Patent: Mar. 5, 2024

(54) MESSAGING SERVER CREDENTIALS EXFILTRATION BASED MALWARE THREAT ASSESSMENT AND MITIGATION

(71) Applicant: Avast Software s.r.o., Prague (CZ)

(72) Inventors: Jakub Křoustek, Rajhrad (CZ); Lukáš Zobal, Archlebov (CZ)

(73) Assignee: Avast Software s.r.o., Prague (CZ)

(*) Notice: Subject to any disclaimer, the term of this patent is extended or adjusted under 35 U.S.C. 154(b) by 209 days.

(21) Appl. No.: 17/356,356

(22) Filed: Jun. 23, 2021

(65) Prior Publication Data
US 2022/0417262 A1 Dec. 29, 2022

(51) Int. Cl.
*H04L 9/40* (2022.01)

(52) U.S. Cl.
CPC .............................. *H04L 63/1416* (2013.01)

(58) Field of Classification Search
CPC ............. H04L 63/1416; H04L 63/1483; H04L 63/1491
See application file for complete search history.

(56) References Cited

U.S. PATENT DOCUMENTS

| | | | | |
|---|---|---|---|---|
| 8,769,684 B2* | 7/2014 | Stolfo | ..................... | G06F 21/55 709/224 |
| 8,973,142 B2* | 3/2015 | Shulman | ............. | H04L 63/0263 455/410 |
| 9,401,927 B2* | 7/2016 | Shulman | ............. | H04L 63/1416 |
| 9,501,639 B2* | 11/2016 | Stolfo | ................... | G06F 21/566 |
| 9,667,651 B2* | 5/2017 | Shulman | ............. | H04L 63/1416 |
| 9,912,695 B1* | 3/2018 | Chao | ................... | H04L 63/1425 |
| 9,917,858 B2* | 3/2018 | Hathaway | ............... | H04L 67/02 |
| 10,230,745 B2* | 3/2019 | Singh | ................. | H04L 63/1491 |
| 10,270,789 B2* | 4/2019 | Singh | ................. | H04L 63/1416 |
| 10,469,523 B2* | 11/2019 | Shulman | ............. | H04L 63/0209 |
| 10,567,342 B2* | 2/2020 | Shulman | ............. | H04L 45/745 |
| 10,609,048 B2* | 3/2020 | Be'ery | ............... | H04L 63/1491 |
| 11,102,244 B1* | 8/2021 | Jakobsson | ............... | H04L 51/42 |
| 11,271,967 B2* | 3/2022 | Borlick | ................. | G06N 20/00 |
| 11,425,166 B2* | 8/2022 | Hebert | ................. | H04L 63/105 |
| 11,431,684 B2* | 8/2022 | Liu | ......................... | G06F 21/55 |
| 11,533,295 B2* | 12/2022 | Shulman | ............. | H04L 63/1491 |

(Continued)

OTHER PUBLICATIONS

Nawrocki, Marcin et al. "A survey on honeypot software and data analysis." arXiv preprint arXiv:1608.06249, 2016.

(Continued)

*Primary Examiner* — Sharon S Lynch
(74) *Attorney, Agent, or Firm* — Dovas Law. P.C.

(57) ABSTRACT

A method includes enabling a messaging server and providing credentials for the messaging server. A computing system is enabled and a malware application is received by the computing system. The malware application is executed by the computing system. The credentials are rendered accessible to the malware application via the computing system, and the malware application is enabled to transmit the credentials via network transmission from the computing system to a computer. An actor is enabled to access the messaging server over a network in response to the actor applying the credentials, and a first electronic message transmitted by the actor is received by the messaging server, the first electronic message including first content.

41 Claims, 7 Drawing Sheets

(56) References Cited

U.S. PATENT DOCUMENTS

| | | | | |
|---|---|---|---|---|
| 11,757,914 | B1* | 9/2023 | Jakobsson | H04L 63/1483 726/25 |
| 2010/0077483 | A1* | 3/2010 | Stolfo | G06F 21/554 726/23 |
| 2010/0269175 | A1* | 10/2010 | Stolfo | H04L 63/1491 726/22 |
| 2012/0084866 | A1* | 4/2012 | Stolfo | H04L 63/1416 726/25 |
| 2013/0263226 | A1* | 10/2013 | Sudia | H04L 63/08 726/4 |
| 2015/0013006 | A1* | 1/2015 | Shulman | H04L 63/1416 726/23 |
| 2015/0135266 | A1* | 5/2015 | Shulman | H04L 63/20 726/1 |
| 2016/0012222 | A1* | 1/2016 | Stolfo | H04L 63/1466 726/23 |
| 2016/0301712 | A1* | 10/2016 | Shulman | H04L 63/0263 |
| 2016/0381023 | A1* | 12/2016 | Dulce | H04L 63/1408 726/9 |
| 2017/0223034 | A1* | 8/2017 | Singh | H04L 63/1433 |
| 2017/0223037 | A1* | 8/2017 | Singh | H04L 63/1441 |
| 2017/0223046 | A1* | 8/2017 | Singh | H04L 63/1491 |
| 2017/0244672 | A1* | 8/2017 | Shulman | H04L 61/5007 |
| 2017/0244749 | A1* | 8/2017 | Shulman | H04L 63/1441 |
| 2019/0253453 | A1* | 8/2019 | Vissamsetty | H04L 63/20 |
| 2020/0036683 | A9* | 1/2020 | Shulman | H04L 63/029 |
| 2020/0137026 | A1* | 4/2020 | Shulman | H04L 63/029 |
| 2020/0137110 | A1* | 4/2020 | Tyler | H04L 63/1483 |
| 2021/0067551 | A1* | 3/2021 | Hebert | H04L 63/102 |

OTHER PUBLICATIONS

Zobal, Lukáš et al. "Current State of Honeypots and Deception Strategies in Cybersecurity." 11th International Congress on Ultra Modern Telecommunications and Control Systems and Workshops (ICUMT). IEEE, 2019, DOI: 10.1109/ICUMT48472.2019.8970921.

Schryen, Guido. "An e-mail honeypot addressing spammers' behavior in collecting and applying addresses." 6th Annual IEEE Smc Information Assurance Workshop, 2005, pp. 37-41, DOI: 10.1109/IAW.2005.1495931.

Bercovitch, Maya et al. "HoneyGen: An automated honeytokens generator." 2011 IEEE International Conference on Intelligence and Security Informatics. IEEE, 2011, pp. 131-136, DOI: 10.1109/ISI.2011.5984063.

Martinez, Cristobal, and Christina Thorpe. "Analysis of spam: honeypot experiment." 16th European Conference on Cyber Warfare and Security. Academic Conferences International Limited, 2017.

Shabtai, A. et al. "Behavioral Study of Users When Interacting With Active Honeytokens". Transactions on Information and System Security, 2016.

* cited by examiner

MESSAGING SERVER CREDENTIALS EXFILTRATION BASED MALWARE THREAT ASSESSMENT AND MITIGATION

FIELD OF INVENTION

The invention relates generally to threat assessment and mitigation in electronic communications, and more particularly to malware assessment and mitigation.

BACKGROUND

Email is currently one of the most common manners of malware distribution. It is also heavily misused for phishing attacks, extortion attempts, financial scams, and other forms of malicious activities. To protect users against email threats, cybersecurity service providers endeavor to stay informed about current trends regarding malicious activities. In practice, cybersecurity products often use machine learning algorithms to distinguish between malicious emails (e.g., malicious spam) and non-malicious emails, otherwise known as clean emails. To achieve accurate decisions, such algorithms require an extensive and up-to-date dataset of malicious emails and clean email samples.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided including enabling a messaging server and providing credentials for the messaging server. A computing system is enabled, and a malware application is received by the computing system. The malware application is executed by the computing system. The credentials are rendered accessible to the malware application via the computing system, and the malware application is enabled to transmit the credentials via network transmission from the computing system to a computer (i.e., another computing system). An actor is enabled to access the messaging server over a network in response to the actor applying the credentials, and a first electronic message transmitted by the actor is received by the messaging server, the first electronic message including first content.

A further method is provided in which a messaging server is enabled, and a plurality of credentials are provided for the messaging server. A computing system is enabled, a plurality of malware applications are received by the computing system, and the plurality of malware applications are executed by the computing system. The plurality of credentials are rendered accessible to the plurality of malware applications via the computing system, wherein unique credentials of the plurality of credentials are rendered accessible to each of the plurality of malware applications and each of the unique credentials are correlated to a respective one of the plurality of malware applications. The plurality of malware applications are enabled to transmit the plurality of credentials from the computing system. An actor is enabled to access the messaging server over a network in response to the actor applying particular unique credentials of the plurality of credentials. A first electronic message transmitted by the actor is received by the messaging server, the first electronic message comprising first content. The first electronic message is correlated to a particular malware application of the plurality of malware applications based on the correlations of the unique credentials to the respective ones of the plurality of malware applications. One or both of a blocking rule or a notification rule is generated based on the correlation of the first electronic message to the particular malware application.

A further method is provided in which a messaging server is enabled, and first credentials and second credentials are provided for the messaging server. A computing system is enabled. A first malware application is received by the computing system, and the first malware application is executed by the computing system. The first credentials are rendered accessible to the first malware application via the computing system, and the first malware application is enabled to transmit the first credentials from the computing system. A first actor is enabled to access the messaging server over a network in response to the first actor applying the first credentials is enabled, and a first electronic message transmitted by the first actor is received by the messaging server, the first electronic message including a second malware application. The second malware application is executed by the computing system, and the second credentials are rendered accessible to the second malware application via the computing system. The second malware application is enabled to transmit the second credentials from the computing system. A second actor is enabled to access the messaging server over a network in response to the second actor applying the second credentials, and a second electronic message transmitted by the second actor is received via the messaging server, the second electronic message comprising a third malware application.

A system is further provided. The system includes a computer including a first processor and a first non-transitory computer-readable storage medium coupled to the first processor and storing first programming instructions for execution by the first processor, wherein the first programming instructions, when executed, cause the computer to perform first operations. The first operations include receiving a malware application, executing the malware application, rendering credentials accessible to the malware application, and enabling the malware application to transmit the credentials.

The system further includes a messaging server including a second processor and a second non-transitory computer-readable storage medium coupled to the second processor and storing second programming instructions for execution by the second processor, wherein the second programming instructions, when executed, cause the messaging server to perform second operations. The second operations include enabling an actor to access the messaging server over a network in response to the actor applying the credentials, and receiving a first electronic message transmitted by the actor, the first electronic message including first content.

The system can further include a computing device including a third processor and a third non-transitory computer-readable storage medium coupled to the third processor and storing third programming instructions for execution by the third processor, wherein the third programming instructions, when executed, cause the computing device to perform third operations. The third operations include enabling an application on the computing device, detecting via the application a second electronic message comprising second content received by the computing device, comparing the first content to the second content, and blocking the second electronic message via the application based on the comparison of the first content to the second content.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
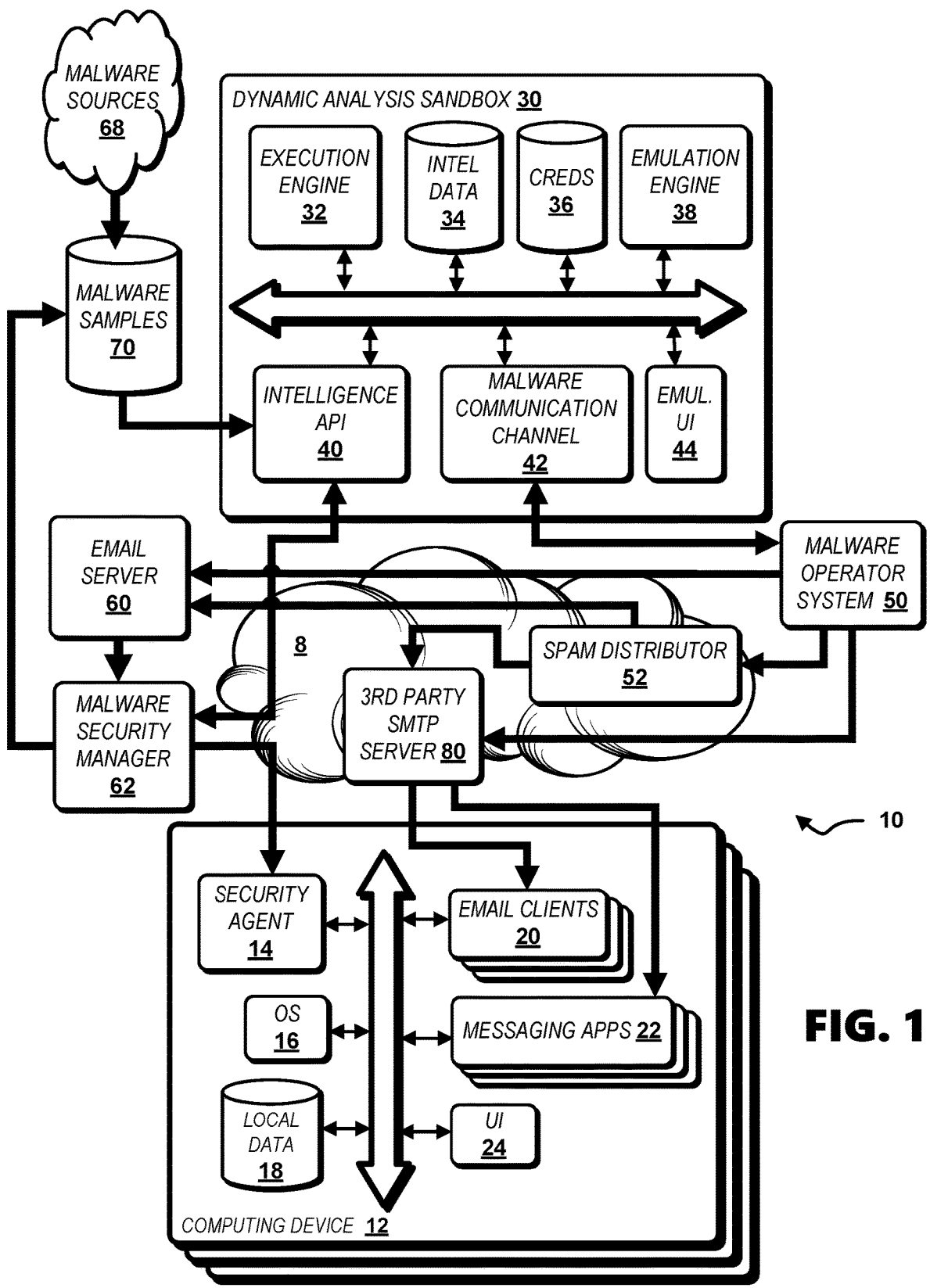
FIG. 1 is a diagram showing an environment in which electronic threats facing users of computing devices operating in a computer network are mitigated according to illustrative embodiments.

Malicious emails and other electronic communications are used in training threat detection systems used in assessing and mitigating threats to protect users and reliably recognize ongoing spam campaigns. There is a need for a source of new malicious emails and electronic communications used in training threat detection systems and creating detection rules and rules for blocking threats and notifying users regarding threats. Different types of electronic communication gathering tools including email honeypots have been used as a source of cyber threat intelligence. There are two general approaches to providing email honeypots. The first is operating an open relay SMTP server, offering anyone to send arbitrary emails. There have been several open-source tools developed for this purpose. The second approach is distributing honey email addresses on the Internet, waiting for crawlers to collect the email addresses, and send malicious emails to the collected email addresses. The type of gathered data heavily depends on where the email addresses are placed, and distributing honey email addresses often leads to collecting unwanted advertisements only, with minimal extractable cyber threat intelligence.

Cyber threat intelligence can include indicators of compromise ("IoCs") such as Internet Protocol (IP) addresses, virus signatures, hashes of malware, and URLs or domain names of botnet command and control servers. Cyber threat intelligence can also include operational details of threat actors including tools, protocols, and procedures used by threat actors. Cyber threat intelligence can further include determined risks of particular cyber threats which can be used in threat management mitigation policies.

Honeypots have proved to be capable of providing a source of new malicious emails. Email honeypots in the form of open relay Simple Mail Transfer Protocol ("SMTP") servers offer to relay arbitrary emails, and due to their nature, are often misused to spread malicious content. Such content can be captured by an email honeypot open relay SMTP servers and used to extract intelligence for cybersecurity purposes. However, open relay servers are often seen as a potential threat by the security community and are blocked by their peers. This leads to a decrease in the efficacy of email honeypot open relay SMTP servers for capturing malicious content. Further, the distributors of malicious emails are often suspicious of such open relay servers due to the extensive use of email honeypots.

In a proposed solution described herein an email server is enabled which requires authentication. Only entities having the credentials can log into the email server and relay emails. Such credentials are distributed as honey tokens through dynamic analysis sandboxes.

Honey tokens as described herein are a virtual resource, a value of which lies in being compromised and used by adversaries. Honey tokens can be used similarly to honeypots. Honey tokens can be used for defensive purposes, for example to warn about an adversary inside an internal network. As described herein, honey tokens are used to target malicious entities (e.g., malware authors and professional spam distributors) who have a high potential to supply malicious spam, which while dangerous from a user perspective, is likely to provide rich cyber threat intelligence.

Referring to FIG. 1, an environment 10 is illustrated in which electronic threats facing users of computing devices 12 operating in a computer network 8 are mitigated. The computer network 8 includes one or more wired or wireless networks or a combination thereof, for example including a local area network (LAN), a wide area network (WAN), the internet, mobile telephone networks, and wireless data networks such as Wi-Fi™ and 3G/4G/5G cellular networks. Operating system 16 (hereinafter "OS 16") is executed on computing devices 12.

A network-connectable processor-enabled malware security manager 62 coupled to a computing device 12 enables threat detection and mitigation to be provided to the computing device 12 via a security agent 14. The security agent 14 is beneficially provided integral with or as an extension to one or more email clients 20 or messaging applications 22 and provides notices to a user via a user interface 24. The malware security manager 62 provides threat intelligence including for example detection rules to the security agent 14 which threat intelligence is stored in the local datastore 18 for enabling the security agent 14 to filter and block email and other message threats received via email clients 20 and messaging applications 22.

Figure 2:
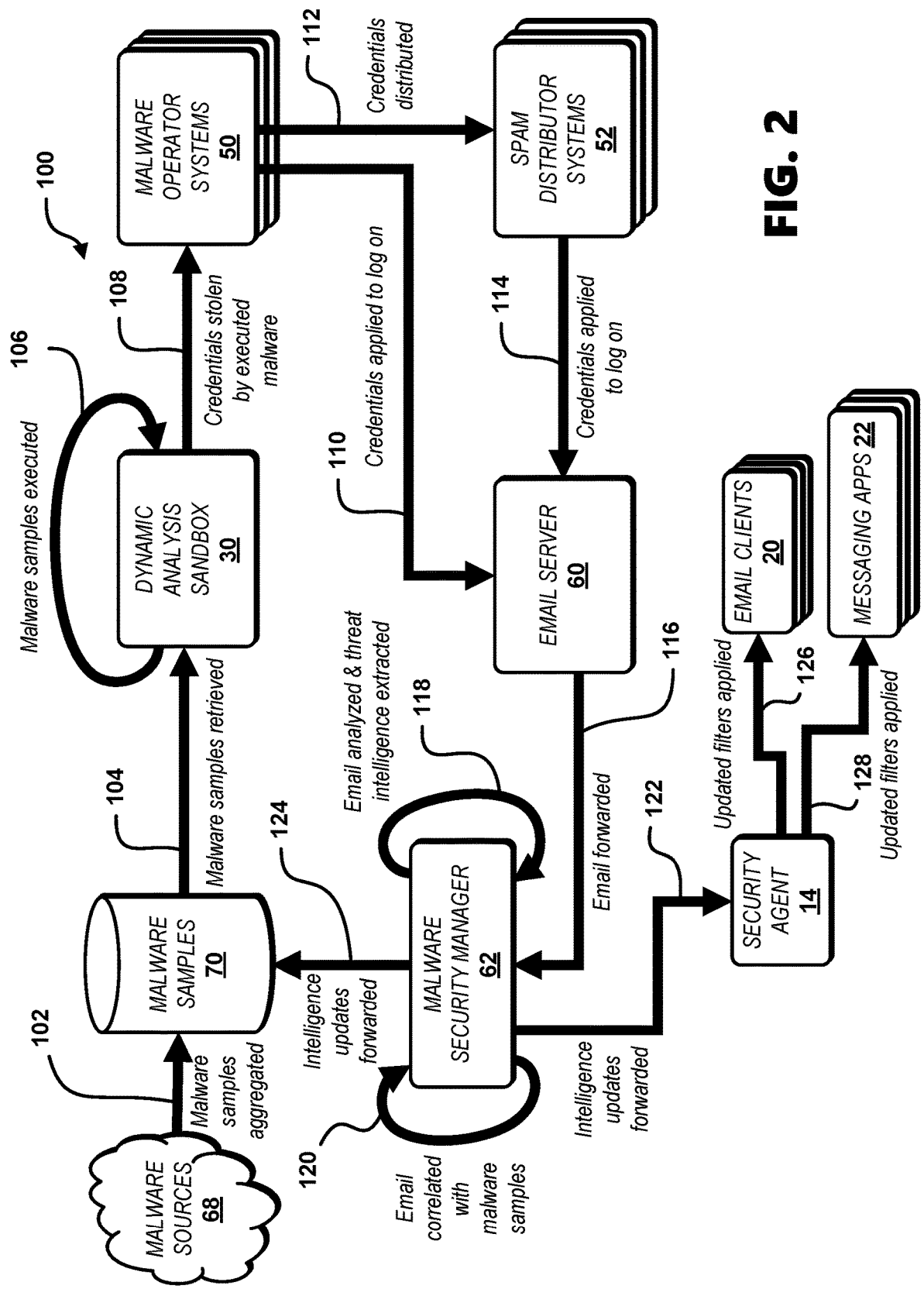
FIG. 2 is a diagram showing a threat assessment and mitigation process with reference to components shown in FIG. 1.

Referring to FIGS. 1 and 2, a threat assessment and mitigation process 100 is shown with reference to components of the environment 10. Threat intelligence collected from malware sources 68 such as email honeypots is supplemented and improved by leveraging a dynamic analysis sandbox 30. Sample credentials-stealing malware applications, suspected credentials-stealing malware applications, and links (e.g., including Universal Resource Locators ["URLs"]) to repositories serving known or suspected credentials-stealing malware applications are collected from malware sources 68 (step 102) and stored in a malware samples datastore 70. Malware sources 68 can include external and internal malware sample feeds. Malware sources 68 can include for instance threat hunting email honeypots, managed client device security applications (e.g., antivirus applications), malware repository mutual samples exchange systems, threat intelligence feeds, and other threat aggregation platforms (e.g., the VirusTotal™ platform). Applications sourced from the malware sources 68 and stored in the malware samples datastore 70 may in fact not be actual malware but merely misclassified as such. Beneficially, applications collected from the malware sources 68 in step 102 have the capability to find and exfiltrate credentials from a computer on which they are executed, which applications are referred to herein as "credentials-stealing malware applications".

Sample malware applications are retrieved (step 104) and executed in the dynamic analysis sandbox 30 (step 106). The malware applications can be retrieved from the malware sample datastore 70 as complete executable malware applications. Alternatively, URLs or other links can be retrieved by the dynamic analysis sandbox 30 from the malware sample datastore 70, which URLs or other links can trigger download of malware applications from a malware operator system 50 or other network accessible data repository. Beneficially, one sample malware application is run at a time on the dynamic analysis sandbox 30, or one sample malware application is run at a time per emulated system of a plurality of emulated systems enabled by the dynamic analysis sandbox 30. Dynamic analysis of the sample malware applications by the dynamic analysis sandbox 30 provides vital information about the threats that the sample malware applications pose. The execution engine 32 executes a sample malware application and gathers intelligence which is then stored in the intelligence datastore 34. Even though the dynamic analysis sandbox 30 enables an isolated environment, sample malware applications are enabled to communicate with their respective authors or operators, represented herein as the malware operator systems 50. The malware applications are limited and controlled by the dynamic analysis sandbox 30 via the execution engine 32 and the malware communication channel 42.

In a step 108, credentials stored by the dynamic analysis sandbox 30 for an authentication-requiring email server 60 are exfiltrated (i.e., stolen) by an executed malware application via the computer network 8 to a malware operator system 50, for example enabled or specified by the operator (e.g., author or owner) of the executed malware application. Each executed and analyzed malware application is offered credentials of the email server 60 in a manner in which the credentials appear to be private credentials of a real user. Credentials are beneficially stored in a credentials datastore 36 accessible to the malware application. The malware application may then exfiltrate the credentials, and with other data, send the credentials to the author or operator of the malware at a malware operator system 50, for example via the malware communication channel 42. The credentials stored by the dynamic analysis sandbox 30 and exfiltrated by a malware application are unique for each analyzed and executed sample malware application, which facilitates tracking of the use of the exfiltrated credentials.

Beneficially the dynamic analysis sandbox 30 employs an emulation engine 38 to work-around and counteract anti-sandbox techniques which may be employed by a malware application. The emulation engine 38 enables an emulated user interface ("UI") 44 of a personal computing environment, for example enabling custom wallpaper, real-looking files and documents, a messy desktop, and a visual history of ostensibly recently opened files. Further, the emulation engine 38 can enable a mouse cursor to move randomly in the emulated UI 44, and also make the emulated UI 44 appear as a computer that has been running for several hours, as opposed to having just been started. The emulation engine 38 can employ advanced techniques for avoiding detection as a sandbox. The techniques can include anti-anti techniques such as avoiding detection of virtualization, avoiding fingerprint identification based on known sandboxes, and avoiding blacklisting based on known sandbox indicators such as screen resolution.

In a particular implementation of the process 100 credentials are visible to a malware application inside an email client (e.g., Microsoft™ Outlook™) and stored in the registry paths (e.g., standard Microsoft™ Windows™ registry paths). The registry paths are generated by the emulation engine 38 and stored in the credentials datastore 36 in an emulated operating environment that appears like a real workstation with an email client installed and actively used by an emulated local user. A malware application can exfiltrate the credentials from the registry paths.

After the credentials are exfiltrated from the dynamic analysis sandbox 30 (step 108) to the malware operator system 50, the malware operator system 50 and associated operators are likely to believe that they have acquired a valuable piece of secret information in the form of the credentials. Such stolen credentials from the dynamic analysis sandbox 30, together with other data from real victims, may be offered via the internet or via overlay networks within the internet (e.g., darknet markets) for other entities to use for their own malicious purposes.

A cybercriminal may distribute the credentials, for example via the malware operator system 50, to other entities by sale or other manner for example to a spam distributor operating a spam distributor system 52 (step 112). Alternatively, the cybercriminal, for example via the malware operator system 50, may directly use the credentials to log into the email server 60 associated with the credentials, beneficially including an SMTP server and email honeypot, and attempt to distribute malicious emails (e.g., malicious spam emails). The email server 60 beneficially includes both an authenticated SMTP server and an email honeypot able to capture emails and extract threat intelligence from the emails. The intelligence can be used in security applications for protecting users from malicious electronic communications.

The malware operators via the malware operator system 50 (step 110) or other entities who have acquired the credentials via the malware operator system 50, for example the spam distributor system 52 (step 114) log in to the email server 60 using the credentials. After initial login, the malware operator or other malicious actor may attempt to relay test emails via the email server 60 to an account controlled by the sender of the email. The email server 60 detects test emails and allows their relay. After determining that the credentials work and that the test emails are relayed, a malicious actor, for example via the malware operator system 50 or the spam distributor system 52 proceeds with sending malicious emails, for example as part of one or more spam campaigns. The email server 60 is configured to scan incoming emails to determine whether emails are malicious and to block malicious emails to preclude relay to recipients unrelated to the malicious actor.

Test emails from a malware operator system 50, spam distributor system 52, or other malicious system can be identified by the email server 60 by peculiar behavior and content. For example, test emails can be identified as emails that include private information about the email server 60 in the body, for example the email server 60 IP address, email server 60 domain, or credentials used to log in. Test emails can be identified as single emails, separate from large campaigns of spam. Test emails can be identified as emails which are brief and include particular predetermined strings for example "test," and which are free of any malicious content in the form of attachments or universal resource locators ("URLs"). Beneficially, the email server 60 applies a threshold on the number of recognized test emails from an email sender (using particular credentials) which are relayed to avoid permitting emails in a spam campaign from being relayed.

The malware operator system 50 or other malicious actor may attempt to determine if the email 60 server is operating for the purpose of gathering intelligence. For example, the malware operator system 50 or other malicious actor may endeavor to send email to themselves or another account they operate and determine if the message is received. To counter this self-emailing, the email server 60 can determine whether to block an email not only based on the credentials used to access the email server 60 and the content of the email, but also based on where the email is coming from and going to. For example, the email can be relayed or blocked based on a comparison of the network location from where the email originates and the network location of the intended destination. By relaying an email which appears malicious and includes malicious subject matter but that is actually intended to be sent to an email address controlled by the malicious actor responsible for transmitting the email (as a validation test), the malicious actor is prevented from determining that credentials are being used for the purpose of deceiving the malicious actor to gather cyber threat intelligence.

The email server 60 captures emails and associates data by a honeypot maintainer provided integral with the email server 60. Captured email, associated email data, and spam campaign information along with respective credentials that were used for logging in to the email server 60 by the email sender are forwarded to a malware security manager 62 (step 116).

The malware security manager 62 further analyzes captured emails and extracts threat intelligence from the emails (step 118). Each email can include several pieces of useful information including attachments, URLs, email body, and email headers and other metadata. It can be determined that a particular attachment should be directly blocked by creating a detection rule. The attachment can be analyzed, tagged with a malware family designation, clustered with similar attachments, and used to improve detection rules and to train models to recognize similar types of malware applications. The analysis in step 118 can be performed on captured emails and associated content via static features such as how captured data looks (e.g., flagging data or applications with the same digital signature), behavioral features such as how malware applications behave when executed (e.g., in a sandbox), or via metadata including information about the samples.

In extracting the intelligence in step 118, URLs can be directly blocked. The whole domain of a particular URL can be blocked in the case where the URL is serving malicious content. The domain certificate of an offending URL can be blocked. Part of an offending URL can be blocked (e.g., via a regular expression). Furthermore, malicious payloads from malicious domains and URLs can be obtained and analyzed as described herein with respect to attachments.

The email body and headers of a malicious email can be analyzed to understand what malware campaigns are currently active. Phishing templates can be recognized, and new techniques used in malicious emails (e.g., malicious spam email) can be identified and analyzed. Different features can be extracted from an email body and email headers, and the extracted features can be used directly to teach machine learning models to recognize current threats better.

Other metadata in malicious emails may contain internet protocol ("IP") addresses or domain names of the actors who have logged into the email server 60. These IP addresses and domain names can be directly blocked, tagged as malicious, reported to internet service provider ("ISPs"), or used for further analysis and correlation with IP addresses from other honeypots.

In a step 120, the malware security manager 62 correlates captured malicious emails with the respective sample malware applications executed by the dynamic analysis sandbox 30. The correlation is based on a comparison of the credentials used to log in to the email server 60 and send a particular malicious email to the unique credentials exfiltrated as respectively associated to each sample malware application executed by the dynamic analysis sandbox 30. Information associating each of the unique credentials to a particular malware application is provided to the malware security manager 62 via the intelligence API 40 to permit the malware security manager 62 to perform the comparison.

The extracted cyber threat intelligence is used to enhance cybersecurity measures and protect users against email threats. The malware security manager 62 transmits intelligence updates (step 122) to a security agent 14 executed on a computing device 12. The security agent 14 applies updated filters to one or more email clients 20 (step 126) or messaging applications 22 (step 128) based on the intelligence updates. The updated filters enable blocking of malicious electronic communications to the email clients 20 and messaging applications 22 based on intelligence extracted from captured emails or other electronic communications. Malicious electronic communications (e.g., emails, electronic text messages) delivered to the email clients 20 or messaging applications 22 can originate from for example from a malware operator system 50 or a spam distributor system 52 and be relayed via a third-party SMTP server 80 which is not enabled for filtering malicious emails.

The malware security manager 62 transmits intelligence updates (step 124) in the form of sample malware applications, emails, URLs, and links extracted from emails captured by the email server 60 to the malware sample datastore 70. In such manner the malware sample datastore 70 is provided with new malware applications to be executed by the dynamic analysis sandbox 30 and URLs and links to be followed via the emulated UI 44 to trigger download of new malware applications to the dynamic analysis sandbox 30.

As described herein, permitting exfiltration of unique credentials from the dynamic analysis sandbox 30 for logging into an email server 60, it is possible to connect spam email campaigns to malware samples and to families of malware samples previously analyzed by the dynamic analysis sandbox 30. Aggregation of cyber threat intelligence for forensic analysis and insights into a cybercrime environment is enabled by connecting spam email campaigns to malware samples and to families of malware samples. For example, identifying malicious actors and their relationships among each other is valuable for criminal and civil investigations.

The described systems and process 100 leverage dynamic analysis of malware samples extensively to distribute honey credentials for access to an authentication-requiring email server 60. The email server 60 is beneficially an SMTP served which functions as an email honeypot. The email traffic from malware authors and other cybercriminals provide a reliable source of cyber threat intelligence including but not limited to new malware applications.

The email server 60 and associated process 100 improves upon the functioning of current email honeypots in several ways. The email server 60 requires authentication and is not an open relay server. As such, the email server 60 avoids abuse reports and being blocked by peers, which would decrease honeypot efficacy. In contrast with open relay servers, cybercriminals and associated systems are not suspicious of the email server 60 because they believe that they acquired a valuable resource in the form of stolen credentials via their credentials-stealing malware, which credentials enable their distributing of malicious email, for example in a spam campaign.

The users of the email server 60 (enabling an email honeypot) can be accurately identified as cybercriminals, malware authors, professional spam distributors, and their related network-accessible computing systems. This is because the only users that have access to the email server 60 are those that have enabled or are otherwise connected to the exfiltration of unique credentials from the dynamic analysis sandbox 30. The cyber threat intelligence generated via the capturing of emails by the email server 60 is therefore richer than that which may be generated by an open relay server, since an open relay server may service both malicious and non-malicious actors sending malicious and non-malicious emails. Malicious emails and malicious email campaigns can be correlated with previously analyzed sample malware that enabled the exfiltration of the unique credentials from the dynamic analysis sandbox 30, which correlations provide intelligence concerning a cybercrime environment and how threat actors operate.

The process 100 and corresponding dynamic analysis sandbox 30, email server 60, and malware security manager 62 provide a variety of benefits and advantages. An email server 60 in the form of an authentication-requiring SMTP server is less prone to abuse reports and being blocked by peers than typical open relay SMTP server honeypots. Using the described process 100, targeted entities including malware authors and professional spam distributors are lured to email honeypots in the form of email servers 60 to the exclusion of other distributers of content such as non-malware distributing advertisers. This leads to the gathering of richer cyber threat intelligence from email honeypots, decreasing the volume of suspicious email threats that require processing and leading to improved protection of users from email threats. Captured email is correlated with previously executed and analyzed malware samples that stole the corresponding unique credentials used for login to the email server 60. The process 100 provides insight into how threat actors operate which is translated into action by a security agent 14 executed on a computing device 12 by enabling the blocking of threatening emails and other electronic messages via email clients 20 and messaging applications 22.

One purpose of the described process 100 is to generate intelligence about the original malware application sample which exfiltrated the applied credentials, which intelligence can include for example a malware family name, attribution to a group or individual (not necessarily already identified), and information about malware campaigns used for spreading the executed malware application sample or similar samples. During the intentional exfiltration of credentials from a dynamic analysis sandbox 30 by such malware applications (step 108), activity can be attributed to particular groups. As unique credentials are provided to each and every malware application (and thus group), it is possible to use the unique credentials for accurate tracking of an infection chain (from exfiltration of credentials to sending of malicious emails) back to a particular group behind an original malicious campaign. Another purpose of the process 100 is to observe spam campaigns that transmit email through the email server 60 using the unique credentials stolen by the original sample malware application.

Threat intelligence extracted in the process 100 can be implemented in various use cases. Threat intelligence can be used by law enforcement when prosecuting malware operators. Extracted threat intelligence covers a substantial part of the infection chain, from exfiltration of credentials to sending of malicious emails. Therefore, it is possible to extract more information from the threat intelligence for building a case by law enforcement.

Threat intelligence extracted in the process 100 can be used for research purposes, for example to better understand the cybercrime environment. Credentials being sold on darknet markets can be tracked. It can be observed whether operators of a particular malware family spread previously analyzed credentials-stealing malware or other malware not yet analyzed.

Threat intelligence extracted in the process 100 can be used for forensic purposes and attribution of particular malware applications to certain malware family authors/operators. Metadata collected by the email server 60 can also be leveraged to track malware family authors/operators and as supportive evidence for forensic purposes. For instance, the IP address and time of the day an attacker using exfiltrated credentials communicates with the email server 60 can be tracked.

Threat intelligence extracted in the process 100 can be used for protecting computing device users. Knowing the intention of the malware operator or operator group which enabled the original sample malware application which exfiltrated the credentials in step 108 can be helpful for better tagging, clustering, and classifying emails received on the email server 60 via the exfiltrated credentials. For example, spam emails, email attachments, or URLs in emails can be more accurately classified if it is known that such emails, attachments, or URLs originate from an actor known for spreading a particular type of malware (e.g., banking Trojans), because such payloads have a higher chance to be also of the same type (e.g., banking Trojans).

Figure 3:
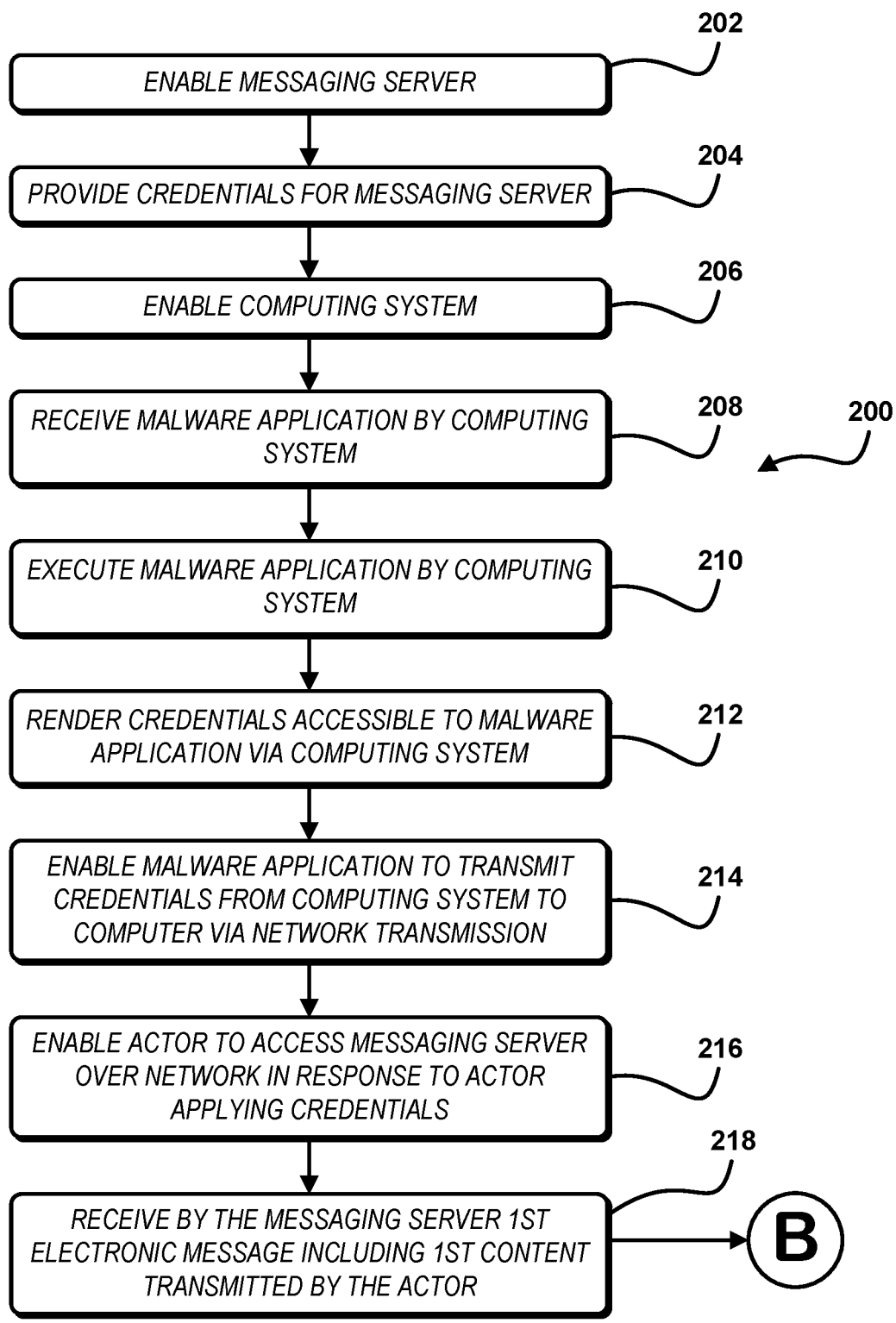
FIGS. 3-7 are diagrams showing methods for enabling mitigation of threats posed by malware applications.

Referring to FIG. 3, a malware counteraction method 200 is shown. The method 200 is described with reference to the components in the environment 10. Alternatively, the method 200 can be performed via other components in other environments and is not restricted to being implemented by the so described components.

In a step 202, a messaging server is enabled, for example the email server 60, and in a step 204 credentials are provided for the messaging server. The credentials can include for example a username and a password, or alternatively only a password (e.g., a character string), and can be generated for example by the dynamic analysis sandbox 30. A computing system is enabled (step 206), for example the dynamic analysis sandbox 30, and a malware application is received by the computing system (step 208). The malware application beneficially includes a credentials-stealing application, for example in the form of a virus, a worm, or a Trojan, which is enabled to search for and steal credentials and to perform other attack actions on a computer on which it is executed. The malware application can be received from a datastore of collected malware application samples, for example the malware samples datastore 70. Alternatively for example, the computing system can receive a URL from a datastore of URLs or electronic messages (e.g., emails) including a plurality of URLs. And the URL can be activated via a browser enabled by the computing system, and the malware application can be received by the computing system via a network responsive to activating the URL, for example from a datastore maintained by a distributor, originator, or author of the malware application.

The malware application is executed by the computing system (step 210). Executing the malware application can include for example executing one or more of a script, an executable code, or a binary file. The malware application can be received to and executed from one or more of random-access memory ("RAM") or computer-readable media (e.g., non-volatile memory such as semiconductor memory devices). The receiving and execution of the malware application is not limited to receiving and executing binary executables installed on computer-readable media.

The credentials (e.g., a username and password, or only a password) are rendered accessible to the malware application via the computing system (step 212). The credentials can be stored in a registry path of the computing system, and the credentials can be rendered exfiltratable by the malware application via the registry path. Alternatively, the credentials can be stored in any shared location on the computing device. Beneficially, a user interface is emulated by the computing system (e.g., the emulated user interface 44), the credentials are stored in a registry path of the computing system accessible via the emulated user interface, and the credentials are exfiltratable by the malware application via the registry path accessible via the emulated user interface. Alternatively, the credentials can be stored in any shared location accessible via the emulated user interface. User actions such as mouse cursor movements can be emulated in the emulated user interface. The emulated user interface and emulated user actions are implemented in an attempt to deceive the malware application and its operators into a false sense of security so as to conclude that the malware application is accessing a harmless victim's computer as opposed to a malware remediating system.

The malware application is enabled to transmit the credentials via network transmission from the computing system to a computer (step 214), for example from the dynamic analysis sandbox 30 to a malware operator system 50 via a malware communication channel 42 over the network 8. Beneficially enabling the malware application to transmit the credentials from the computing system includes enabling the malware application to transmit the credentials via a network interface of the computing system via network communication to a network-accessible computer (e.g., to a malware operator system 50) via the internet.

The method 200 further includes enabling an actor to access the messaging server over a network in response to the actor applying the credentials (step 216) and receiving by the messaging server a first electronic message transmitted by the actor, the first electronic message including first content (step 218). The messaging server beneficially authenticates the credentials to enable the actor to access the messaging server. The actor can include the computer to which the credentials were transmitted, for example the malware operator system 50. Alternatively, the actor can include a network-accessible processing device that receives the credentials from the computer directly or via one or more intermediaries, for example the spam distributor system 52, or other network-accessible computer. The messaging server beneficially includes a Simple Mail Transfer Protocol ("SMTP") email server, and the first electronic message can include a first email.

Figure 4:
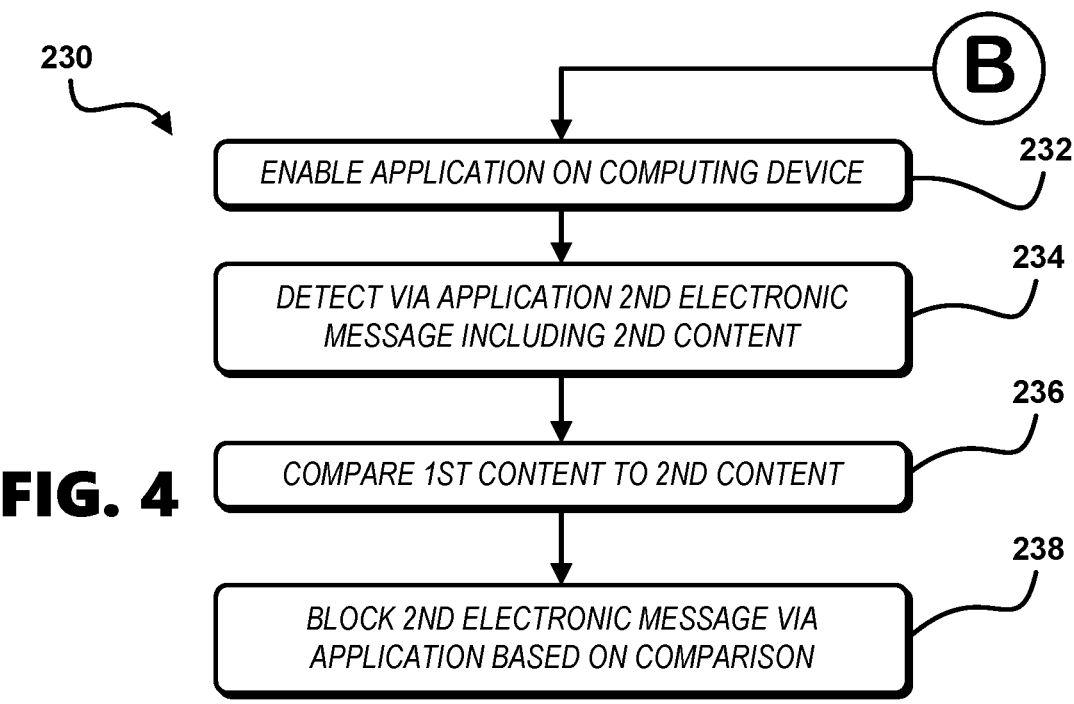

Referring to FIG. 4, in an extension 230 to the method 200 at connector B, an application (e.g., the security agent 14) is enabled on a computing device (step 232), for example the computing device 12, and a second electronic message (e.g., an email) including second content received by the computing device is detected via the application (step 234). The first content is compared to the second content (step 236), for example via the application, and the second electronic message is blocked via the application based on the comparison of the first content to the second content (step 238). The computing device beneficially enables an electronic inbox for receiving electronic message communications, and blocking the second electronic message includes directing the second electronic message away from the electronic inbox of the computing device, for example to a trash folder or a spam folder. Comparing the first content to the second content can include comparing one or more of a first body, a first header, a first attachment or a first link of the first content to one or more of a second body, a second header, a second attachment or a second link of the second content. Further, comparing the first content to the second content can include comparing one or more of a first plurality of bodies, a first plurality of headers, a first plurality of attachments or a first plurality of links of the first content to one or more of a second plurality of bodies, a second plurality of headers, a second plurality of attachments or a second plurality of links of the second content. A match can be determined between the first content and the second content based on the comparison of the first content and the second content, the second electronic message can be blocked via the application based on the determination of the match between the first content and the second content. For example, the first content and the second content can include identical or substantially identical components.

The method 200 allows for continuous receipt of new malware applications for generating threat detection rules. New malware applications and links to new malware applications are received via electronic messages enabled by rendering credentials accessible and transmittable by other malware applications. Since the credentials used in accessing the messaging server are known to originate from a malware application which has exfiltrated them from the computing system, the electronic messages received can be assumed with high certainty to include malicious content (e.g., a credentials-stealing application), include a malicious link or URL, or be otherwise associated with a malware spreading campaign (e.g., a test message).

In a particular implementation of the method 200, the malware application received by the computing system is correlated with the first electronic message based on the credentials applied by the actor. Further, a notification can be generated based on the correlation of the malware application with the first electronic message, for example "This message is associated with a known malicious actor."

Figure 5:
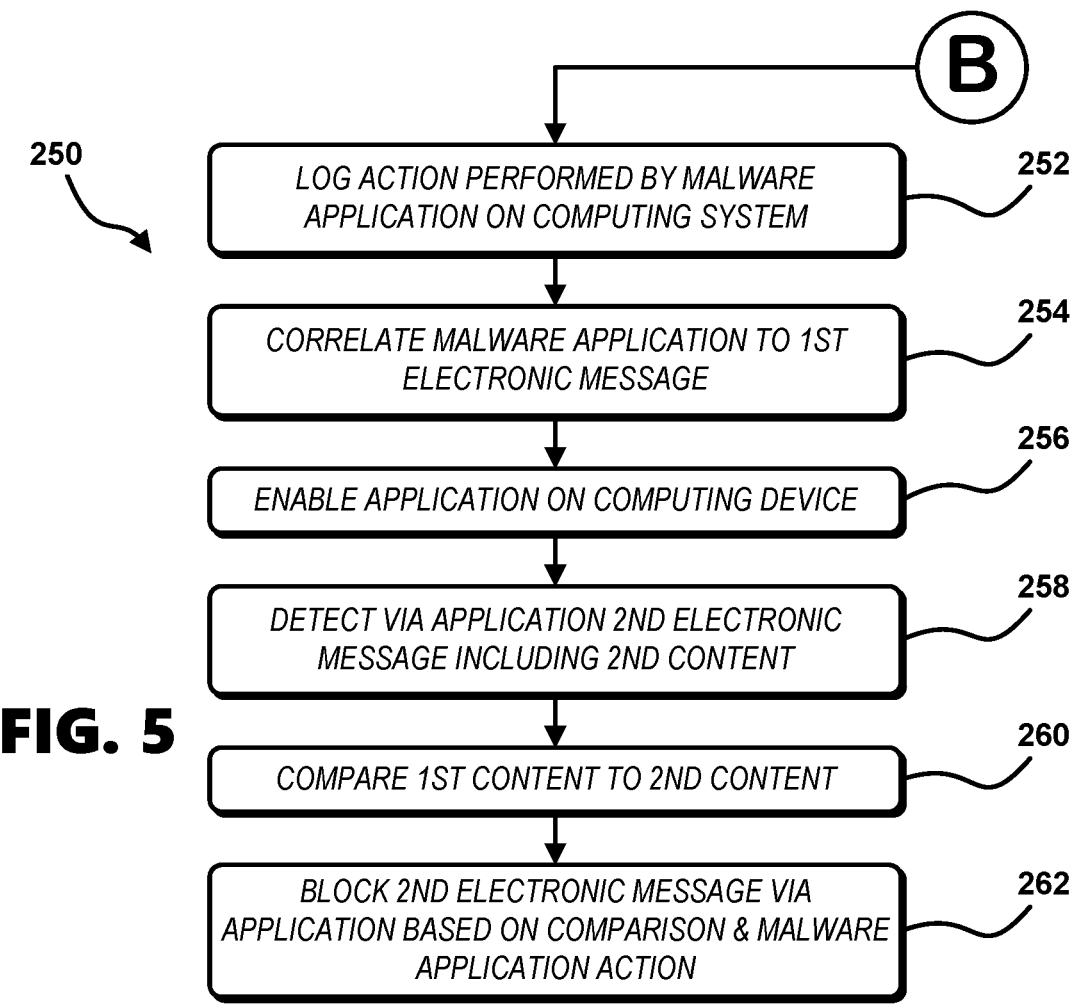

Referring to FIG. 5, in an alternative second extension 250 to the method 200 at connector B, an action (e.g., an attack on the computing system) performed by the malware application on the computing system is logged (step 252), and the malware application is correlated to the first electronic message (step 254). An application is enabled on a computing device (step 256), for example the computing device 12, and a second electronic message including second content received by the computing device is detected via the application (step 258). The first content is compared to the second content (step 260), and the second electronic message is blocked via the application based on the comparison of the first content to the second content and based on the action performed by the malware application on the computing device (step 262). In an alternative to or in addition to the blocking action of the blocking of step 262, a notification can be generated on the computing device based on the comparison of the first content to the second content and based on the action performed by the malware application on the computing system.

The method 200 can further include selectively filtering a plurality of electronic messages transmitted by the actor via the messaging server based on intended recipients of the plurality of electronic messages. In an alternative implementation, the method 200 can include receiving by the messaging server a plurality of electronic messages including the first electronic message transmitted by the actor, the plurality of electronic messages including a plurality of content, and scanning the plurality of content of the plurality of electronic messages, and selectively relaying the plurality of electronic messages based on the scan of the content.

In another implementation, the method 200 can further include receiving by the messaging server a plurality of electronic messages transmitted by the actor, and determining for each of the plurality of electronic messages a first network location from where the electronic message originates and a second network location to where the electronic message is intended to be delivered. Each of the plurality of electronic messages can be selectively filtered based on the first network location from where the electronic message originates and the second network location to where the electronic message is intended to be delivered.

The method 200 can include for example scanning the first content of the first electronic message, detecting one or both of a universal resource locator ("URL") or a file attachment in the first electronic message based on the scanning, and blocking relay by the messaging server of the first electronic message based on the detection of the one or both of the URL or the file attachment. The method 200 can further include receiving by the messaging server a second electronic message transmitted by the actor, the second electronic message including second content, and scanning the second content of the second electronic message, and detecting an absence of a URL and an absence of a file attachment in the second electronic message based on the scanning, and relaying by the messaging server the second electronic message based on the absence of the URL and the absence of the file attachment. Another example implementation can include detecting in a body of the first electronic message one or more of an internet protocol ("IP") address of the messaging server, a domain of the messaging server, or the credentials based on the scanning, and relaying by the messaging server the first electronic message based on the detection in the body of the first electronic message of the one or more of the IP address of the messaging server, the domain of the messaging server, or the credentials.

Figure 6:
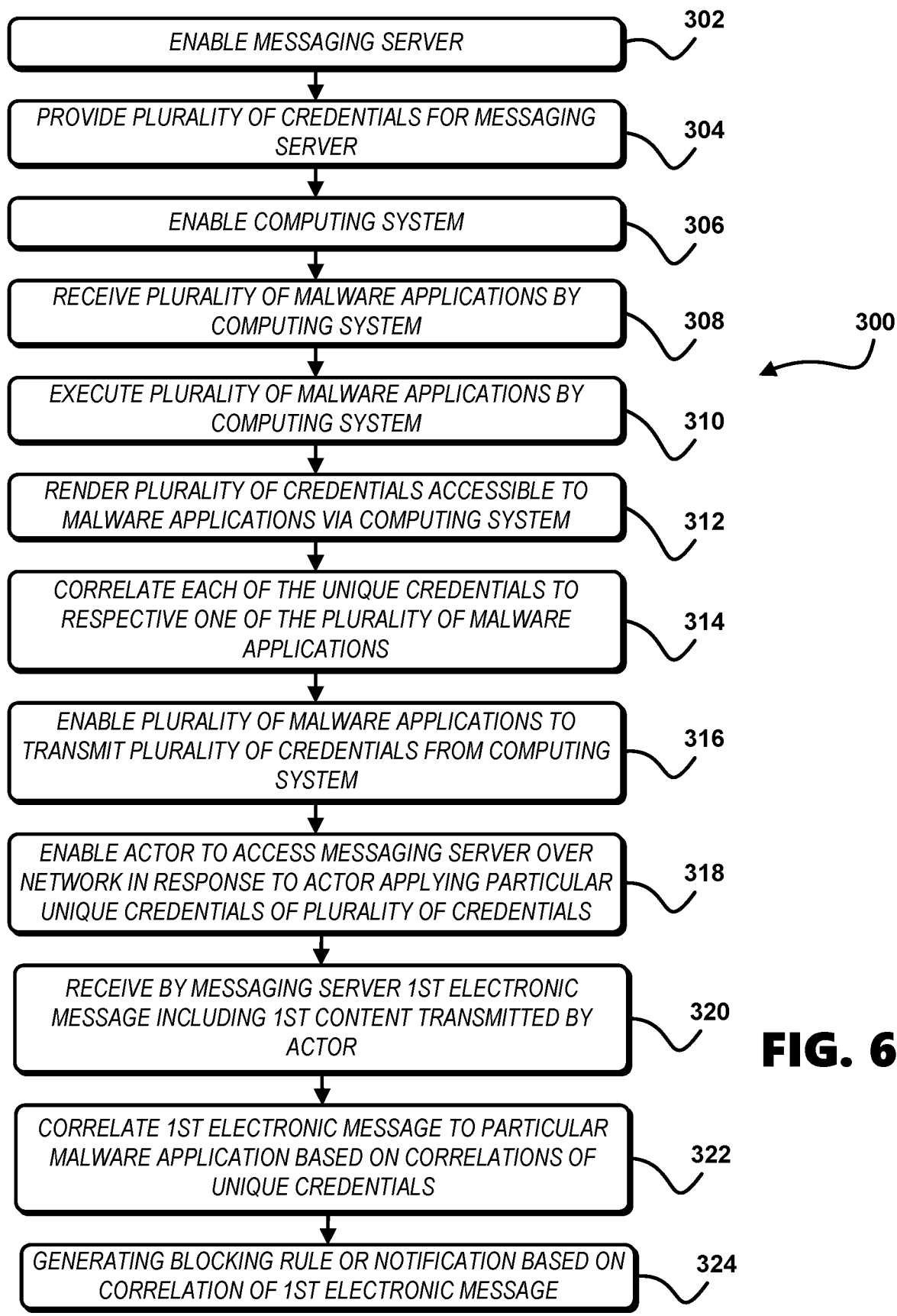

Referring to FIG. 6, a malware counteraction method 300 is shown. The method 300 is described with reference to the components in the environment 10. Alternatively, the method 300 can be performed via other components in other environments and is not restricted to being implemented by the so described components.

In a step 302 a messaging server (e.g., the email server 60) is enabled, and in a step 304 a plurality of credentials are provided for the messaging server. A computing system is enabled (step 306), for example the dynamic analysis sandbox 30. A plurality of malware applications are received by the computing system (step 308), and the plurality of malware applications are executed by the computing system (step 310). The plurality of credentials are rendered accessible to the plurality of malware applications via the computing system (step 312). Unique credentials of the plurality of credentials are rendered accessible to each of the plurality of malware applications and each of the unique credentials are correlated to a respective one of the plurality of malware applications (step 314). Beneficially the malware applications are executed serially on a particular emulated user interface or executed simultaneously on different emulated user interfaces of the computing system to enable unique credentials to be rendered accessible to each of the plurality of malware applications. The plurality of malware applications are enabled to transmit the plurality of credentials from the computing system (step 316). Beneficially, the plurality of malware applications are enabled to transmit the plurality of credentials via a network interface of the computing system via network communication to a network-accessible computer (e.g., to a malware operator system 50) via the internet.

An actor is enabled to access the messaging server over a network in response to the actor applying particular unique credentials of the plurality of credentials (step 318). The messaging server beneficially authenticates the particular unique credentials to enable the actor to access the messaging server. A first electronic message transmitted by the actor is received by the messaging server, the first electronic message including first content (step 320). The first electronic message is correlated to a particular malware application of the plurality of malware applications based on the correlations of the unique credentials to the respective ones of the plurality of malware applications (step 322). One or both of a blocking rule or a notification rule is generated based on the correlation of the first electronic message to the particular malware application (step 324). An action (e.g., an attack) can be determined to be performed by the particular malware application on the computing system, and the blocking rule or the notification can be generated further based on a severity of the action performed by the malware application on the computing system. A blocking rule can be applied for example to block access by a user to malicious electronic messages (e.g., messages including malware applications or links to malware applications) received by a user on a computing device. Also, a blocking rule can be applied to block receipt by a computing device of malicious electronic messages and block execution of malware applications. Further, a blocking rule can be applied to block IP addresses corresponding to sources of malicious electronic messages and IP addresses corresponding to sources of malicious applications. A notification rule can be applied to notify a user of their receipt of a malicious electronic message (e.g., a message including a malware application or a link to a malware application) and to notify a user of a potential threat of a received electronic message.

In an extension to the method 300, an application on a computing device can be enabled. A second electronic message including second content received by the computing device can be detected via the application, and the first content can be compared to the second content. The second electronic message can be blocked via the application based on the comparison of the first content to the second content and based on the blocking rule. Alternatively, or in addition to the blocking, a notification can be provided via the application based on the comparison of the first content to the second content and based on the notification rule.

Figure 7:
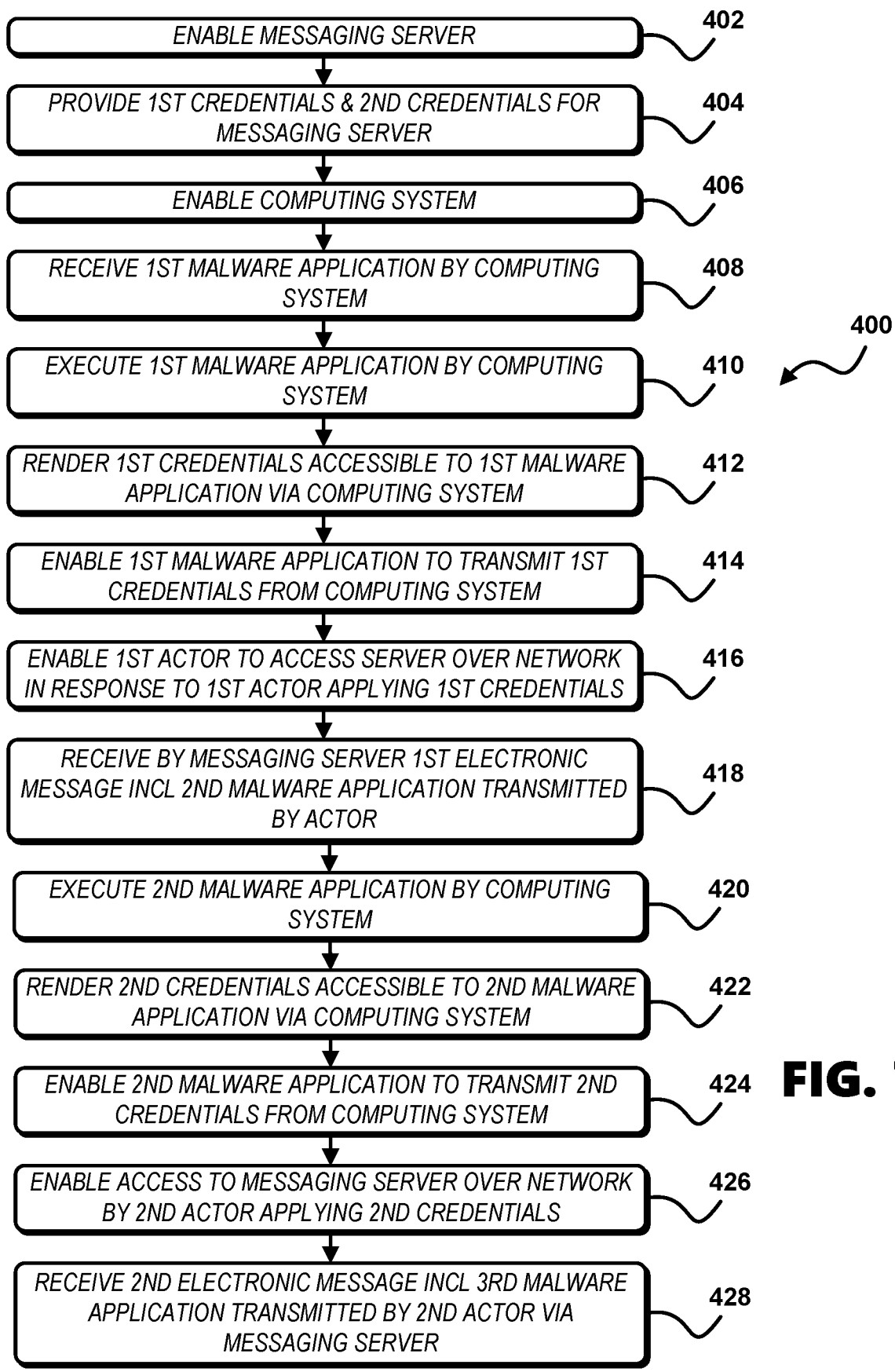

Referring to FIG. 7, a malware counteraction method 400 is shown. The method 400 is described with reference to the components in the environment 10. Alternatively, the method 400 can be performed via other components in other environments and is not restricted to being implemented by the so described components.

In a step 402 a messaging server is enabled, and in a step 404 first credentials and second credentials are provided for the messaging server. The messaging server is beneficially an email server (e.g., email server 60), for example a Simple Mail Transfer Protocol ("SMTP") email server. A computing system is enabled (step 406). A first malware application is received by the computing system (step 408), and the first malware application is executed by the computing system (step 410). The first credentials are rendered accessible to the first malware application via the computing system (step 412), and the first malware application is enabled to transmit the first credentials from the computing system (step 414), for example via network communication to a network-accessible computer (e.g., to a malware operator system 50). A first actor is enabled to access the messaging server over a network in response to the first actor applying the first credentials (step 416). The messaging server beneficially authenticates the first credentials to enable the first actor to access the messaging server. A first electronic message transmitted by the first actor is received by the messaging server (step 418), the first electronic message including a second malware application. The second malware application is executed by the computing system (step 420), and the second credentials are rendered accessible to the second malware application via the computing system (step 422). The second malware application is enabled to transmit the second credentials from the computing system (step 424), for example via network communication to a network-accessible computer (e.g., to a malware operator system 50).

A second actor is enabled to access the messaging server over the network in response to the second actor applying the second credentials (step 426). The messaging server beneficially authenticates the second credentials to enable the second actor to access the messaging server. A second electronic message transmitted by the second actor is received by the messaging server (step 428), the second electronic message including a third malware application. The method 400 allows for continuous aggregation of a datastore of malware applications for generating threat detection rules. New malware applications and links to new malware applications are received via electronic messages enabled by rendering credentials accessible and transmittable by other malware applications.

In an extension to the method 400, an application can be enabled on a computing device, and a third electronic message including content received by the computing device can be detected via the application. The content can be compared to the third malware application, and the third electronic message can be blocked via the application based on the comparison of the content to the third malware application. For example, the third electronic message can be blocked based on the content of the third electronic message including another application including code identical to code of the third malware application.

Figure 8:
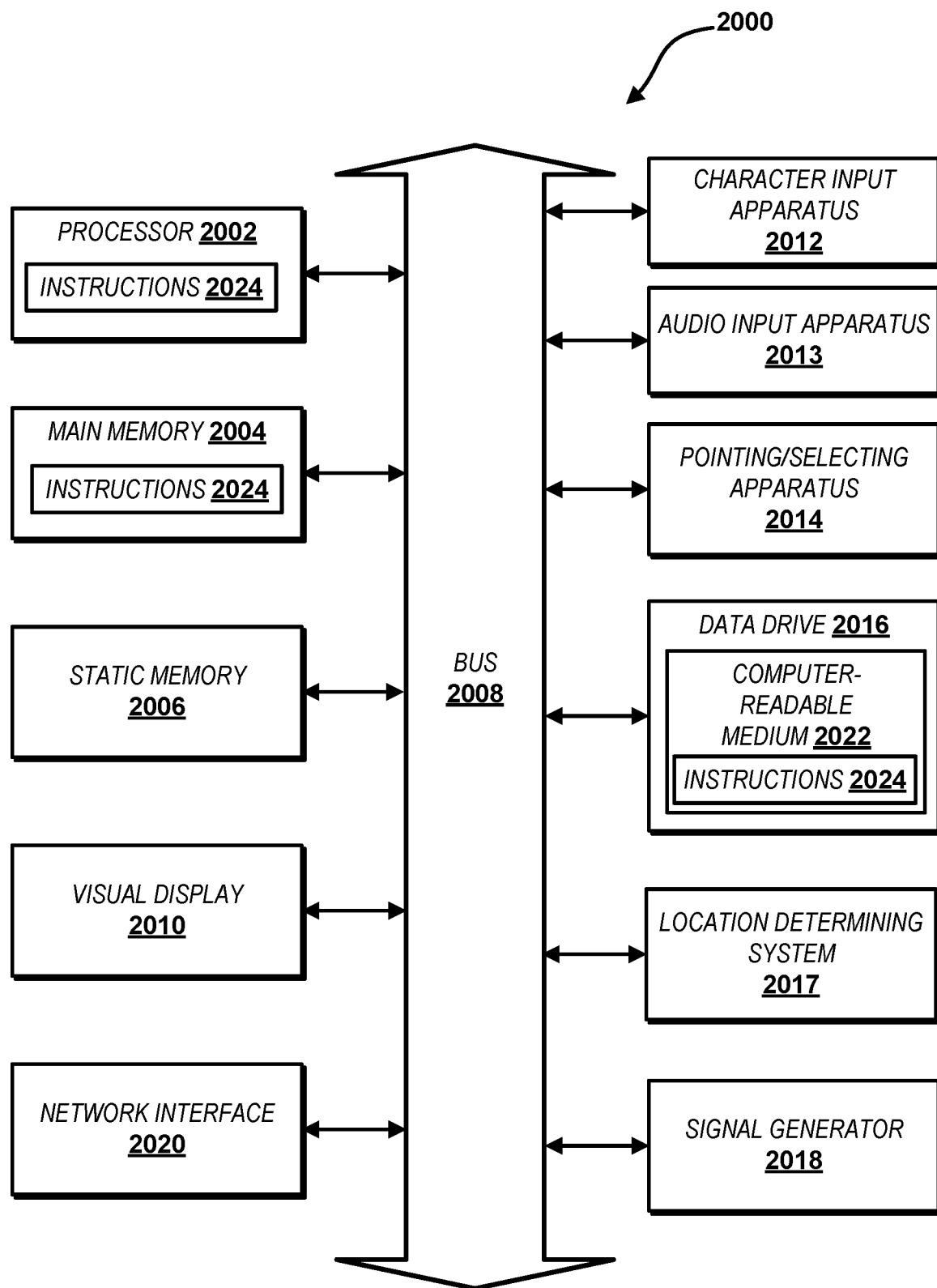
FIG. 8 shows a computer system for performing described methods according to illustrative embodiments.

FIG. 8 illustrates in abstract the function of an exemplary computer system 2000 on which the systems, methods and processes described herein can execute. For example, the computing device 12, the dynamic analysis sandbox 30, and the email server 60 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
    enabling a messaging server;
    providing credentials for the messaging server;
    enabling a computing system;
    receiving a first application by the computing system, the first application comprising a malware application;
    executing the first application by the computing system;
    rendering the credentials accessible to the first application via the computing system;
    enabling the first application to transmit the credentials via network transmission from the computing system to a computer;
    enabling an actor to access the messaging server over a network in response to the actor applying the credentials;
    receiving by the messaging server a first electronic message transmitted by the actor, the first electronic message comprising first content;
    enabling a second application on a computing device, the second application comprising an extension to at least one of an email client or a messaging application on the computing device;
    transmitting the first content to the second application on the computing device based on the actor applying the credentials and based on the receiving by the messaging server the first electronic message transmitted by the actor;
    detecting via the second application a second electronic message comprising second content received by the computing device;
    comparing the first content to the second content; and
    blocking the second electronic message via the second application based on the comparison of the first content to the second content.

2. The method of claim 1, wherein the computing device enables an electronic inbox for receiving electronic message communications, and blocking the second electronic message comprises directing the second electronic message away from the electronic inbox of the computing device.

3. The method of claim 1, wherein comparing the first content to the second content comprises comparing at least one of a first body, a first header, a first attachment or a first link of the first content to at least one of a second body, a second header, a second attachment or a second link of the second content.

4. The method of claim 1, wherein comparing the first content to the second content comprises comparing at least one of a first plurality of bodies, a first plurality of headers, a first plurality of attachments or a first plurality of links of the first content to at least one of a second plurality of bodies, a second plurality of headers, a second plurality of attachments or a second plurality of links of the second content.

5. The method of claim 1, further comprising:
    determining a match between the first content and the second content based on the comparison of the first content and the second content; and
    blocking the second electronic message via the second application based on the determination of the match between the first content and the second content.

6. The method of claim 1, further comprising correlating the first application to the first electronic message based on the credentials applied by the actor.

7. The method of claim 6, further comprising generating a notification based on the correlation of the first application to the first electronic message.

8. The method of claim 1, further comprising:
    logging an action performed by the first application on the computing system;
    correlating the first application to the first electronic message;
    and
    blocking the second electronic message via the second application further based on the action performed by the first application on the computing system.

9. The method of claim 1, further comprising:
    logging an action performed by the first application on the computing system;
    correlating the first application to the first electronic message;
    and
    generating a notification on the computing device based on the comparison of the first content to the second content and based on the action performed by the first application on the computing system.

10. The method of claim 1, further comprising selectively filtering a plurality of electronic messages transmitted by the actor via the messaging server based on intended recipients of the plurality of electronic messages.

11. The method of claim 1, further comprising:
receiving by the messaging server a plurality of electronic messages transmitted by the actor;
determining for each of the plurality of electronic messages a first network location from where the electronic message originates and a second network location to where the electronic message is intended to be delivered; and
selectively filtering each of the plurality of electronic messages based on the first network location from where the electronic message originates and the second network location to where the electronic message is intended to be delivered.

12. The method of claim 1, wherein the actor comprises the computer.

13. The method of claim 1, wherein the actor comprises a network-accessible processing device that receives the credentials from the computer directly or via one or more intermediaries.

14. The method of claim 1, wherein the messaging server comprises an email server.

15. The method of claim 1, further comprising:
storing the credentials in a registry path of the computing system; and
rendering the credentials exfiltratable by the first application via the registry path.

16. The method of claim 1, wherein the first application comprises a credentials-stealing application.

17. The method of claim 1, wherein the first application comprises at least one of a virus, a worm, or a Trojan.

18. The method of claim 1, further comprising:
emulating a user interface by the computing system;
storing the credentials in a shared location of the computing system accessible via the emulated user interface; and
rendering the credentials exfiltratable by the first application via the shared location.

19. The method of claim 1, further comprising:
emulating a user interface by the computing system;
storing the credentials in a registry path of the computing system accessible via the emulated user interface; and
rendering the credentials exfiltratable by the first application via the registry path.

20. The method of claim 19, further comprising emulating user actions in the emulated user interface.

21. The method of claim 1, further comprising:
activating a URL via a browser enabled by the computing system; and
receiving the first application by the computing system via network communication responsive to activating the URL.

22. The method of claim 1, wherein executing the first application comprises executing at least one of a script, an executable code, or a binary file.

23. The method of claim 1, further comprising:
scanning the first content of the first electronic message;
detecting at least one of a universal resource locator ("URL") or a file attachment in the first electronic message based on the scanning; and
blocking relay by the messaging server of the first electronic message based on the detection of the at least one of the URL or the file attachment in the first electronic message and based on the actor applying the credentials.

24. The method of claim 23, further comprising:
receiving by the messaging server a third electronic message transmitted by the actor, the third electronic message comprising third content;
scanning the third content of the third electronic message;
detecting an absence of a URL and an absence of a file attachment in the third electronic message based on the scanning; and
relaying by the messaging server the third electronic message based on the absence of the URL and the absence of the file attachment.

25. The method of claim 23, further comprising:
detecting at least one of an internet protocol ("IP") address of the messaging server, a domain of the messaging server, or the credentials in a body of the first electronic message based on the scanning; and
relaying by the messaging server the first electronic message based on the detection of the at least one of the IP address of the messaging server, the domain of the messaging server, or the credentials in the body of the first electronic message.

26. The method of claim 1, further comprising:
receiving by the messaging server a plurality of electronic messages including the first electronic message transmitted by the actor, the plurality of electronic messages comprising a plurality of content;
scanning the plurality of content of the plurality of electronic messages; and
selectively relaying the plurality of electronic messages based on the scan of the content.

27. The method of claim 1, wherein the credentials comprise a username and a password.

28. The method of claim 1, wherein:
the messaging server comprises a Simple Mail Transfer Protocol ("SMTP") server; and
the first electronic message comprises a first email.

29. The method of claim 1, further comprising authenticating the credentials by the messaging server to enable the actor to access the messaging server.

30. The method of claim 1, wherein enabling the first application to transmit the credentials from the computing system comprises enabling the first application to transmit the credentials via a network interface of the computing system to a network-accessible computer via the internet.

31. A method comprising:
enabling a messaging server;
providing a plurality of credentials for the messaging server;
enabling a computing system;
receiving a plurality of malware applications by the computing system;
executing the plurality of malware applications by the computing system;
rendering the plurality of credentials accessible to the plurality of malware applications via the computing system, wherein unique credentials of the plurality of credentials are rendered accessible to each of the plurality of malware applications;
correlating each of the unique credentials to a respective one of the plurality of malware applications;
enabling the plurality of malware applications to transmit the plurality of credentials from the computing system to at least one computer;
enabling an actor to access the messaging server over a network in response to the actor applying particular unique credentials of the plurality of credentials;

receiving by the messaging server a first electronic message transmitted by the actor, the first electronic message comprising first content;

correlating the first electronic message to a particular malware application of the plurality of malware applications based on the correlations of the unique credentials to the respective ones of the plurality of malware applications;

generating at least one of a blocking rule or a notification rule based on the correlation of the first electronic message to the particular malware application;

enabling another application on a computing device, the another application comprising an extension to at least one of an email client or a messaging application on the computing device;

transmitting the blocking rule and the first content to the another application on the computing device based on the actor applying the credentials and based on the receiving by the messaging server the first electronic message transmitted by the actor;

detecting via the another application a second electronic message comprising second content received by the computing device;

comparing the first content to the second content; and blocking the second electronic message via the another application based on the comparison of the first content to the second content and based on the blocking rule.

32. The method of claim 31, a further comprising:
determining an action performed by the particular malware application on the computing system and determining a severity of the action; and
generating the blocking rule further based on the severity of the action.

33. The method of claim 31, further comprising
providing a notification via the another application based on the comparison of the first content to the second content and based on the notification rule.

34. The method of claim 31, further comprising authenticating the particular unique credentials by the messaging server to enable the actor to access the messaging server.

35. A method comprising:
enabling a messaging server;
providing first credentials and second credentials for the messaging server;
enabling a computing system;
receiving a first malware application by the computing system;
executing the first malware application by the computing system;
rendering the first credentials accessible to the first malware application via the computing system;
enabling the first malware application to transmit the first credentials from the computing system;
enabling a first actor to access the messaging server over a network in response to the first actor applying the first credentials;
receiving by the messaging server a first electronic message transmitted by the first actor, the first electronic message comprising a second malware application;
executing the second malware application by the computing system;
rendering the second credentials accessible to the second malware application via the computing system;
enabling the second malware application to transmit the second credentials from the computing system;

enabling a second actor to access the messaging server over the network in response to the second actor applying the second credentials; and receiving by the messaging server a second electronic message transmitted by the second actor, the second electronic message comprising a third malware application;

enabling another application on a computing device, the another application comprising an extension to at least one of an email client or a messaging application on the computing device;

transmitting the third malware application to the another application on the computing device based on the second actor applying the second credentials and based on the receiving by the messaging server the second electronic message transmitted by the second actor;

detecting via the another application a third electronic message comprising content received by the computing device;

comparing the content to the third malware application; and blocking the third electronic message via the another application based on the comparison of the content to the third malware application.

36. The method of claim 35, wherein:
the messaging server comprises a Simple Mail Transfer Protocol ("SMTP") server;
the first electronic message comprises a first email;
the second electronic message comprises a second email; and
the third electronic message comprises a third email.

37. The method of claim 35, further comprising:
authenticating the first credentials by the messaging server to enable the first actor to access the messaging server; and
authenticating the second credentials by the messaging server to enable the second actor to access the messaging server.

38. A system comprising:
a computer comprising at least a first processor and at least a first non-transitory computer-readable storage medium coupled to the at least the first processor and storing first programming instructions for execution by the at least the first processor, wherein the first programming instructions, when executed, cause the computer to perform first operations comprising:
receiving a first application comprising a malware application;
executing the first application;
rendering credentials accessible to the first application; and
enabling the first application to transmit the credentials; and
a messaging server comprising at least a second processor and at least a second non-transitory computer-readable storage medium coupled to the at least the second processor and storing second programming instructions for execution by the at least the second processor, wherein the second programming instructions, when executed, cause the messaging server to perform second operations comprising:
enabling an actor to access the messaging server over a network in response to the actor applying the credentials; and
receiving a first electronic message transmitted by the actor, the first electronic message comprising first content;

a computing device comprising at least a third processor and at least a third non-transitory computer-readable storage medium coupled to the at least the third processor and storing third programming instructions for execution by the at least the third processor, wherein the third programming instructions, when executed, cause the computing device to perform third operations comprising:

enabling a second application on the computing device, the second application comprising an extension to at least one of an email client or a messaging application on the computing device;

receiving the first content from the messaging server based on the actor applying the credentials and based on receiving by the messaging server the first electronic message transmitted by the actor;

detecting via the second application a second electronic message comprising second content received by the computing device;

comparing the first content to the second content; and blocking the second electronic message via the second application based on the comparison of the first content to the second content.

39. The system of claim 38, the third operations further comprising receiving an intelligence update comprising the first content from the messaging server via a security manager.

40. A method comprising:

enabling a messaging server;

providing credentials for the messaging server;

enabling a computing system;

receiving a first application by the computing system, the first application comprising a malware application;

executing the first application by the computing system;

rendering the credentials accessible to the first application via the computing system;

enabling the first application to transmit the credentials via network transmission from the computing system to a computer;

enabling an actor to access the messaging server over a network in response to the actor applying the credentials;

receiving by the messaging server a first electronic message transmitted by the actor, the first electronic message comprising first content;

enabling a second application on a computing device, the second application comprising an extension to at least one of an email client or a messaging application on the computing device;

transmitting the first content to the second application on the computing device based on the actor applying the credentials and based on receiving by the messaging server the first electronic message transmitted by the actor;

detecting via the second application a second electronic message comprising second content received by the computing device;

comparing the first content to the second content; and generating a notification based on the comparison of the first content to the second content.

41. A method comprising:

enabling a messaging server;

providing credentials for the messaging server;

enabling a computing system;

storing the credentials in a registry path of the computing system;

receiving a first application by the computing system, the first application comprising a malware application;

executing the first application by the computing system;

rendering the credentials accessible to the first application via the computing system and rendering the credentials exfiltratable by the first application via the registry path;

enabling the first application to transmit the credentials via network transmission from the computing system to a computer;

enabling an actor to access the messaging server over a network in response to the actor applying the credentials;

receiving by the messaging server a first electronic message transmitted by the actor, the first electronic message comprising first content;

enabling a second application on a computing device;

transmitting the first content to the second application on the computing device based on the actor applying the credentials and based on the receiving by the messaging server the first electronic message transmitted by the actor;

detecting via the second application a second electronic message comprising second content received by the computing device;

comparing the first content to the second content; and blocking the second electronic message via the second application based on the comparison of the first content to the second content.

* * * * *